April 7, 1959
F. A. DE WIESS ET AL
2,881,282
SWITCHING DEVICE
Filed Jan. 27, 1954
2 Sheets-Sheet 1
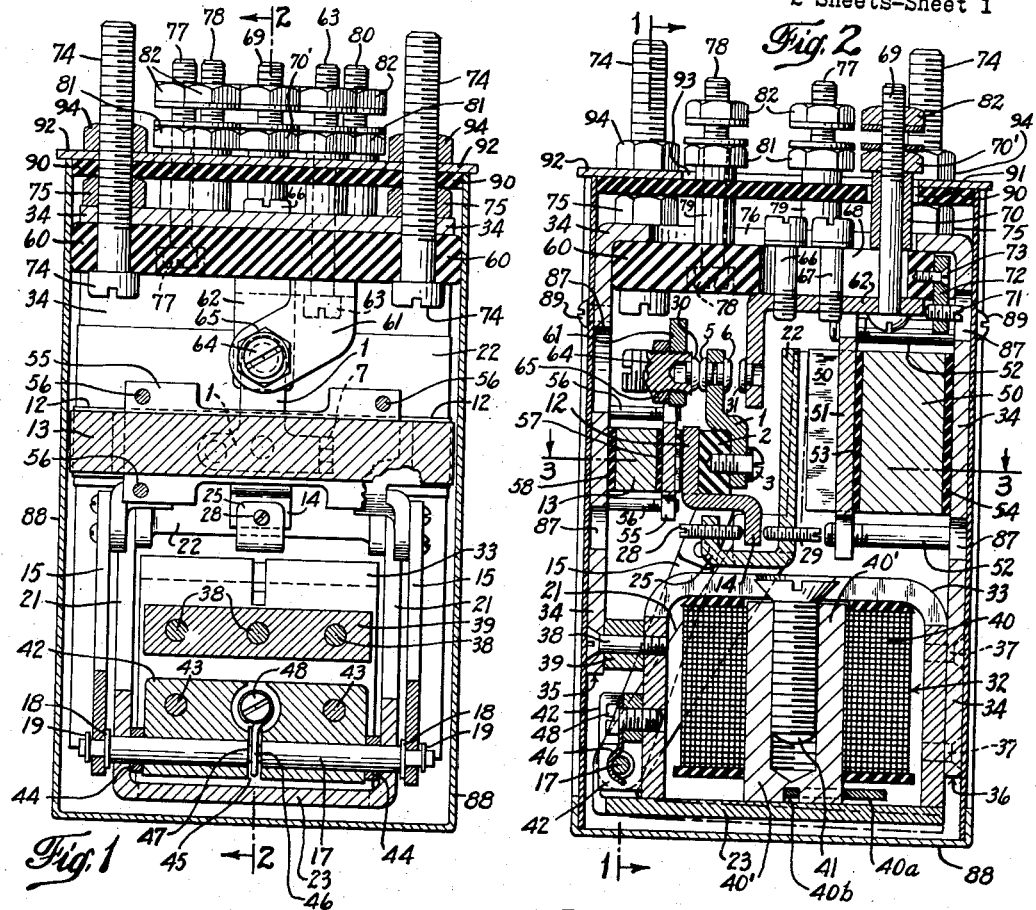
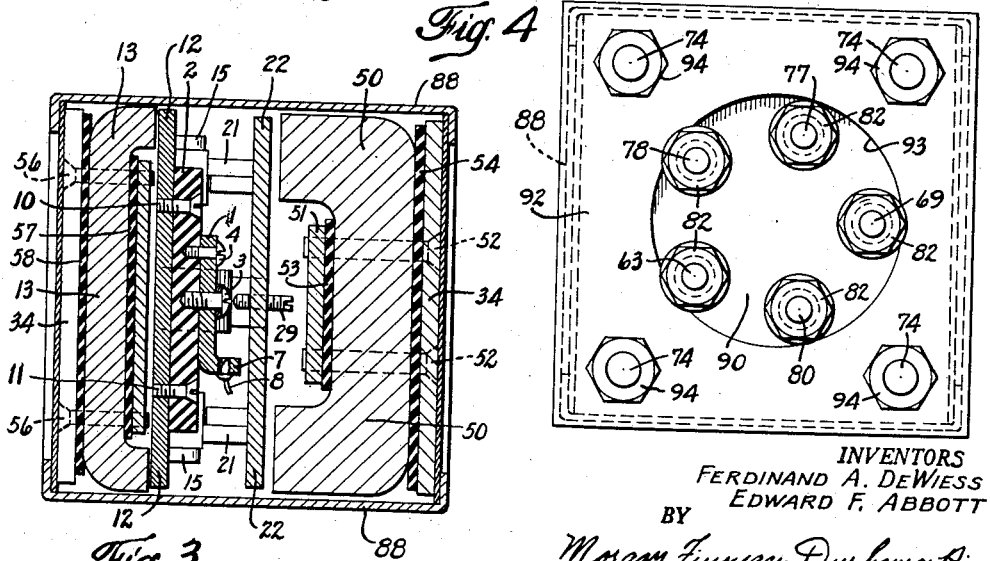
INVENTORS
FERDINAND A. DeWIESS
EDWARD F. ABBOTT
BY
Morgan, Finnegan, Durham & Pine
ATTORNEYS.

April 7, 1959
F. A. DE WIESS ET AL
2,881,282
SWITCHING DEVICE
Filed Jan. 27, 1954
2 Sheets-Sheet 2
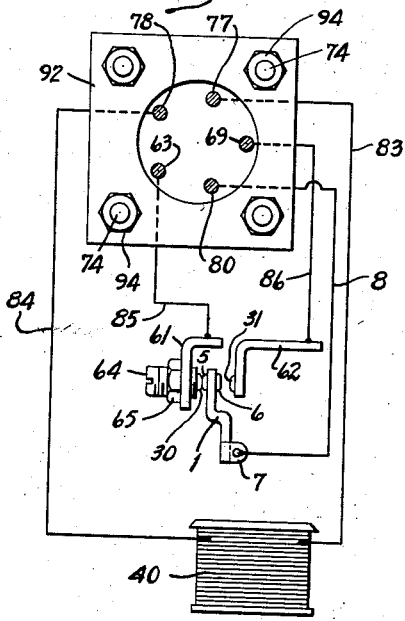
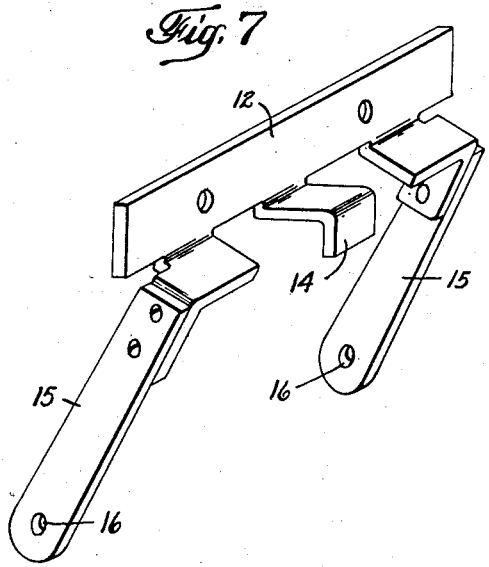
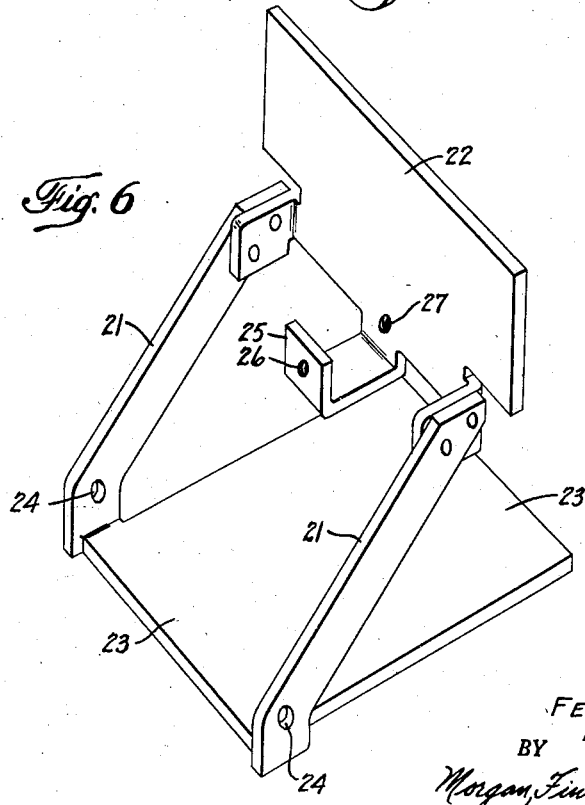
INVENTORS
FERDINAND A. DEWIESS
EDWARD F. ABBOTT
BY
Morgan, Finnegan, Durham & Pine
ATTORNEYS.

United States Patent Office 2,881,282
Patented Apr. 7, 1959

2,881,282

SWITCHING DEVICE

Ferdinand A. de Wiess, Tuckahoe, N.Y., and Edward F. Abbott, Arlington, Tex., assignors to De Lackner Helicopters, Inc., a corporation of New York Application January 27, 1954, Serial No. 406,498

10 Claims. (Cl. 200—91)

This invention relates to solenoid-operated switching devices and is illustrated as embodied in an alternating current (A.C.) relay.

Among the operating difficulties encountered in the operation of relays are: "bounce" on close of the contact points; and, change of contact pressure even including opening of the contacts, induced by outside vibration, shock loads, and hum of solenoids. The latter is by far the most common source of trouble.

Change of contact pressure induced by extraneous vibrations and/or A.C. hum is reflected in the imposition or inducing of a corresponding frequency in the current flowing in a circuit controlled by the relay contact points. Since the presence of such extraneous frequencies cannot be tolerated in relay-controlled circuits of certain highly complex electronic equipment intended for use in aircraft and for industrial or other uses, it is customary to employ D.C. relays for the necessary switching operations in the controlled circuits, the relays customarily being actuated either directly from a 24 volt direct-current generator, or indirectly from an A.C. generator of a capacity in the range of from 24 volts up to 115 volts, feeding A.C. rectifiers located ahead of and supplying D.C. power to the D.C. relays. Further, since electronic responses in many relay-controlled circuits can be obtained only after the elapse of a given number of cycles, there is a strong desire or trend toward the employment with A.C. systems, of higher frequencies and, in particular, frequencies of about 400 cycles per second. For certain usages, frequencies of 2000–3000 cycles per second are envisaged.

It is therefore among the objects of this invention to enable switching operations to be performed in a frequency-sensitive circuit by means of switching devices actuated by an alternating current power source, without the use of voltage or current rectifying devices ahead of the relay as required heretofore, and without inducing undesired on undesirable current or voltage frequencies in the controlled circuit corresponding to the voltage or current frequencies of the A.C. power source.

It is a further object of the present invention to eliminate "bounce" on close of the contact points and change of contact pressure induced by A.C. hum, outside vibration and/or shock, by eliminating all resilient members between suspension and contact points of the switching device so that the contact pressure will not be obtained by elastic force, and maintaining contact pressure by magnetic traction and rigid elements only.

It is a further object of this invention to eliminate change of contact pressure induced by extraneous vibrations, shock and/or solenoid hum, by so insulating or decoupling the contacts from the solenoid that the solenoid force is used only for tripping or triggering of the movable contact-carrying switching member during phases of changes of position.

It is a further object of this invention to provide a new and improved switching device which is shock proof as respects the contact pressure.

Other and further objects of this invention will appear from the following description, the accompanying drawings and the appended claims.

In general, the switching device of this invention comprises a movable switching member which carries any desired number of contact points, is mounted for movement into and out of contact with a contact point or points, and is sometimes hereinafter referred to as a movable contact member. The movable contact member, when engaged with any such contact point or points, is held firmly thereagainst solely, or substantially solely, by magnetic traction derived from a magnetic field of constant polarity. The magnetic tractive force exerted on the movable contact member in its engaged position is of magnitude to maintain at least the necessary minimum contact pressure under the maximum external vibratory forces and/or shock loads, gravitational or otherwise, for which the switching device in general, and the movable contact member in particular, is designed, or to which it is intended to be subjected, in use.

Switching of the movable contact member from at least one position to another is effected in successive phases of movement in which the contact member is mechanically moved away from one position toward the other against the magnetic tractive force resisting the movement until the magnetic tractive force tending to draw the movable contact member into and hold it in the other position is able to take over and complete the action by magnetic traction alone. This moving of the movable contact member is effected by a movable lever member which is normally immobilized and held by permanent magnet means in a position of rest and is adapted to be moved against the holding action of the permanent magnet to move the movable contact member, upon energizing of electro-magnetic means provided for the purpose. The construction and arrangement of the lever member in accordance with this invention is such that so soon as the lever member has moved the contact member out of the one position a distance sufficient for the magnetic tractive force thereafter to take over and complete the switching movement to the other position, the lever member is thereupon automatically mechanically insulated and decoupled from the contact member thereby ensuring against transmission of A.C. solenoid "hum" in particular from the solenoid via the lever member to the contact points. Interruption of the current supply to the electro-magnet, or levering solenoid, permits the immobilizing permanent magnet to take over and restore the lever member, permitting the contact member to be restored by magnetic force to the original position. Advantageously, the permanent magnet means for immobilizing the lever member in its normal position of rest, may be same as that used for holding the contact member in the position corresponding to de-energization of the solenoid, although it is within the contemplation of this invention to use separate permanent magnet means for the respective purposes.

In the accompanying drawings which form part of the instant specification and are to be read in conjunction therewith, and in which like numbers refer to like parts throughout the several views:

Fig. 1 is a view in section of an illustrative embodiment of a switching device in accordance with this invention, the view being taken along the line 1—1 of Fig. 2;

Fig. 2 is a view in section taken along the line 2—2 of Fig. 1;

Fig. 3 is a view in section taken along the line 3—3 of Fig. 2;

Fig. 4 is a view in top plan of the embodiment of Fig. 1;

Fig. 5 is a semi-schematic view of the electrical circuits of the embodiment of Fig. 1;

Fig. 6 is a view in perspective of the rigid trigger member of the embodiment of Fig. 1; and Fig. 7 is a view in perspective of the rigid switch arm of the embodiment of Fig. 1.

Referring now more particularly to the accompanying drawings, a movable rigid contact member 1, preferably of brass, is fastened to an insulating block 2 as by means of screws 3 and 4 and is provided with a pair of contact points 5 and 6, preferably of silver alloy, which are soldered or otherwise suitably secured thereto. The end of the contact member 1 secured to the insulating block 2, is provided with an offset terminal portion 7 to which a flexible electrical lead 8 is secured at one end, the other end being attached to an external connecting terminal 80 as shown in Fig. 5.

The insulating block is secured removably, as by means of bolts 10 and 11, to an armature member 12 which is preferably of soft iron and is suitably disposed in relation to a permanent horseshoe magnet 13 as to be held by its magnetic traction in closely spaced relation thereto in one phase of operation as will be more fully described hereinafter.

The armature member 12 is of a construction to provide, intermediate its ends, a downwardly extending tongue portion 14 by which the armature member is adapted to be moved toward and away from the permanent magnet 13, and is supported at its opposite ends on parallel rigid swing arms 15 which, in turn, are provided with co-axially aligned openings 16 at their lower ends. The movable contact member 1, the insulating block 2, the armature 12, and the swing arms 15 together constitute a rigid unitary switch arm which is pivotally mounted for limited angular movement toward and away from the permanent magnet 13, upon a horizontally disposed swing armature shaft 17 which traverses the openings 16 so as to permit relative rotation of the switch arm on the swing armature shaft. The shaft 17 is of reduced diameter at each end and is provided with spacers 18 and lock washers 19 serving to secure the switch arms against axial movement on the shaft 17.

A pair of rigid cantilever arms 21 disposed in spaced parallel relation to each other and to the swing arms 15, carry at their upper ends a vertically extending armature member 22, and at their lower ends a horizontally extending armature member 23. The cantilever arms 21 are suitably apertured as at 24 to receive the swing armature shaft 17, and the armature member 22 is provided with a tongue portion 25 having a threaded aperture 26 co-axially aligned with a corresponding threaded aperture 27 in the armature member 22. The threaded apertures 26 and 27 are provided with set screws 28 and 29 respectively between the corresponding inner ends of which floats the tongue portion 14 of the armature member 12. The system constituted by the cantilever arms 21, the vertically extending armature member 22 with its tongue portion 25, and the horizontally extending armature 23 forms a unitary rigid lever member which is adapted to be magnetically oscillated by magnetic traction means to be hereinafter described, for levering the movable contact member 1 from one to the other of a pair of contact points 30 and 31 respectively.

A solenoid 32 comprised of a stationary U-shaped armature 33 is fixedly secured at opposite sides of the latter to a U-shaped switch frame 34 which, as here preferably embodied, has legs of unequal length 35 and 36. The solenoid armature 33 is secured at one side to the long leg 36 of the switch frame by bolts 37, and is secured at the opposite side to the short leg 35 by bolts 38 which traverse a spacer member 39 disposed between the armature and the switch frame.

The solenoid armature 33 carries the usual coil 40 surrounding an end-slotted metal core 40′ which is fastened to the stationary armature 33 by a bolt 41 and, in turn, is provided with a suitable shading coil such, for example, as the copper ring 40a seated in the slot 40b. The armature 33 also serves to support a journal block 42 for the armature shaft 17, secured thereto as by rivets 43. The journal block 42 is suitably apertured to receive the swing armature shaft 17 and is spaced at its opposite ends from the cantilever arms 21 of the lever member by washers 44. A slot 45 in the journal block serves to permit the application to the armature shaft 17, of a locking member 46 which extends into a central circumferentially recessed locking channel 47 formed in the shaft 17 in aligned relation with the slot 45. The locking member 46 is removably secured to the journal block by a bolt 48 threadedly engaged therewith and serves to prevent axial movement of the armature shaft 17.

The horizontally extending armature member 23 serves as the solenoid swing armature and, when the solenoid is energized, is drawn firmly against the solenoid core 40′ and the solenoid stationary armature 33 so as to lie in the horizontal solid line position shown in Figure 2 and at a right angle or substantially a right angle to the permanent magnet armature 22.

A permanent horseshoe magnet 50 of greater size and strength than the permanent magnet 13 is fixedly secured to the switch frame 34 in suitable relation to the vertically extending armature member 22 to exert a magnetic tractive force thereon. The relationship of the magnet 50 and the armature member 22 is such that with the solenoid energized, the armature member 22 substantially parallels the pole surfaces of the magnet in determined spaced relation thereto and generally as in the solid line position shown in Fig. 2.

The magnets 50 and 13 are secured to the switch frame 34 by magnet yokes 51 and 55, respectively, and corner bolts 52 and 56, respectively. Pads 53 and 54 of felt, rubber or other suitable vibration or shock dampening elastic material are disposed between magnet 50 and the yoke 51 and switch frame 34, respectively. Like pads 57 and 58 cushion the magnet 13.

An insulator or mounting plate 60 of "Micarta" or other suitable electrical insulating material provides a mounting for rigid metal contact frames 61 and 62, preferably of brass, carrying the silver alloy contacts 30 and 31, respectively. The contact frame 61 is bolted fixedly to the mounting plate 60 by a terminal bolt 63 passing up through the plate 60, and threadedly receives a contact screw 64 which terminates in the contact 30. A lock nut 65 permits of the screw being locked against undesired axial movement from a given setting.

The contact frame 62 is slidably adjustably mounted on the plate 60 by means of bolts 66 and 67 which traverse a narrow slot 68 in the plate 60 into threaded engagement with the contact frame 62, to permit of adjustment of the contact 31 axially of the slot, toward and away from the contact 30. The heads of the bolts 66 and 67 are of a diameter sufficient to span the width of the slot. When the correct setting of the contact frame has been attained, the bolts 66 and 67 are tightened firmly against the mounting plate 60.

Electrical connection to the contact frame 62 is effected by a metal terminal bolt 69 which traverses the slot 68 with its head engaging the underside of the contact frame 62 and its shank passing through a tubular metal spacer 70 whose lower end spans the slot 68. The spacer 70 is seated firmly on plate 60 by a clamping nut 70′ threadedly engaging bolt 69, thereby to achieve good electrical connection between the bolt 69 and the contact frame 62. Adjustment of the contact point 31 toward the contact 30 may be effected by an adjusting screw 71 threadedly carried by a contact adjuster plate 72 which in turn is removably fastened to the mounting plate 60 by one or more screws 73.

The mounting plate 60 is securely releasably fastened to the switch frame 34 by threaded clamping bolts 74 passing upwardly through the plate and frame at the respective corners of the mounting plate. The shank of each bolt is provided with a clamping nut 75 by which the bolt head is drawn firmly against the plate 60.

The switch frame 34 is apertured at its top to provide a circular central opening 76 for the upward non-contacting passage of: the terminal bolt 69 and spacer 70, the terminal bolt 63 having a similar spacer 73, and other metal terminal bolts 77, 78, and 80 each with a similar spacer 79. Each of the bolts 77, 78, and 80 has its head seated in a recess in the under side of the mounting plate 60. Each of the bolts 63, 77, 78 and 80 is threadedly engaged by a clamping nut 81 seated on the respective bolt spacers 79 whereby pressure can be exerted on the bolt head for clamping such internal electrical leads as are necessary between the bolt heads and the mounting plate. Each terminal bolt is also provided with a terminal nut 82 by which the external electrical leads may be secured to the respective bolts.

Referring to Fig. 5, it will be seen that the terminal bolts 77 and 78 are connected by internal leads 83 and 84, respectively, to the respective terminals of the solenoid coil 40; the terminal bolt 63 is connected as represented by internal lead 85 to the contact frame 61; the terminal bolt 69 is connected as represented by the internal lead 86 to the contact frame 62; and, the terminal bolt 80 is connected in fact by the internal lead 8 to the lug 7 of the movable contact member 1.

The switch frame 34 is also provided with suitable apertures 87 for permitting access to and adjustment of the trigger member adjusting screws 28, 29, the contact screw 64 and the contact frame adjusting screw 71.

An imperforate casing 88, open at the top, encases the switch frame and its attached parts, and is attached to the switch frame as by screws 89. The open top of the casing is closed by an insulator shield plate 90 which is suitably apertured as indicated at 91 for the non-contacting passage of the spacers 70 and 79 and rests on the nuts 75 snugly within the casing 88. A cover plate 92 centrally apertured as at 93 for the passage of the terminal bolts 63, 69, 77, 78 and 80 fits over the clamping bolts 74 and is clamped securely against the casing 88 and the insulator shield 90, by nuts 94 threadedly engaging the bolts 74.

Assuming the circuit through the solenoid coil 40 to be closed by the application of an alternating current power source to the terminals 77 and 78, the magnetic traction of the solenoid will have caused the solenoid swing armature 23 of the lever member to move from the dash-dot line position shown in Fig. 2 to the solid line position in which it is abutting the stationary solenoid armature 33. In so doing, the large magnet armature 22 will have been moved by the swing armature, from its dash-dot line position wherein it is against, or closely adjacent to the large permanent magnet 50, to its solid line position as shown. In this position, of the lever member, the screws 28 and 29 carried by the tongue portion 25 of the large magnet armature 22 will be entirely clear, as shown, of the tongue portion 14 of the small magnet armature 12 of the switch arm. Thus, any A.C. hum imparted by the A.C solenoid to the lever member will not be transferred from the lever member through the switch arm, to the contact points 5 and 31. Hence, a constant pressure will be maintained between these contacts solely by the magnetic traction of the small magnet 13 acting on the armature 12 of the switch arm. This traction is sufficient to prevent change of contact pressure below a determined minimum under the designed conditions, and the circuit between the terminals 63 and 80 is complete or "on."

Assuming now that the external circuit to the solenoid is interrupted, the magnetic traction of the large magnet 50 acting on the lever armature member 22 will swing the lever member clockwise on the swing armature shaft 17 as viewed in Fig. 2, until the set screw 28 is brought to bear against the tongue portion 14 of the switch arm. The mechanical force exerted by the set screw on the tongue portion 14 will swing the switch arm clockwise on the shaft 17, away from the small magnet 13 against the magnetic traction of the latter until the movable contact member 1 has moved sufficiently far toward the contact 31 that the magnetic traction of the large magnet 50 acting on the armature 22 will draw the movable contact 6 into firm contact with the fixed contact 31. The large magnet armature 22 under these conditions will be pressing against the large magnet 50, and the tongue portion 14 will be still engaged by the set screw 28 but will be spaced from the set screw 29. Under these conditions the strength of the large magnet will be used to supply the contact pressure. In the reverse operation, with the solenoid "on," there will be a small initial outward movement of the large magnet armature 22 before the set screw 29 engages the tongue portion 14. Further movement levers the switch arm armature 12 toward the small magnet until the solenoid swing armature 23 is brought to rest against the solenoid stationary armature 33. At this time, the magnet traction of the small magnet completes the final movement of the armature 12, separating the tongue 14 from the screw 29. The screw 28 is spaced from the tongue 14 sufficiently so that it will not be contacted by the tongue 14 in the seated position of the contacts 5 and 30.

Advantageously, the switch arm and the lever member may be mounted so that their pivot axes are their respective centers of gravity, thereby eliminating movement under severe shock loads.

It will be understood that in operation some "welding" of the contact points may be caused by the passage of current therethrough. The large magnet 50 and the solenoid 32 are therefore of a strength effective to break the contact under normal conditions of operation. In accordance with a specific example, the large magnet 50 possessed a holding force of 83 grams (2.93 oz.) and the small magnet a holding force of 69 grams (2.44 oz.).

The invention in its broader aspects is not limited to the specific mechanisms described but departures may be made therefrom within the scope of the accompanying claims without departing from the principles of the invention and without sacrificing its chief advantages.

What is claimed is:

1. A switching device comprising a pair of contact means, the units of said pair being structurally rigid but relatively movable into and out of a position of contact with each other; mechanical means engageable with one of said units for moving and holding said one unit out of said position of contact; a pair of permanent magnet means, a first unit of said pair of permanent magnet means exerting a magnetic tractive force on said one unit of said pair of contact means sufficient when the units of said pair of contact means are in said position of contact, to maintain at least a determined minimum contact pressure between the respective units of said pair of contact means, and the second unit of said pair of permanent magnet means exerting a magnetic tractive force on said mechanism means sufficient to move and hold the units of said pair of contact means out of said position of contact against the tractive force of said first unit of said pair of permanent magnet means; and, electro-magnetic means for moving said mechanical means at will against the magnetic tractive force of the second unit of said pair of permanent magnet means, both said contact means being characterized by the fact that when in said position of contact they form a system which is inherently free of elastic members responsive to harmonic vibrations and is incapable of acquiring vibratory energy.

2. A switching device as in claim 1 in which one of said pair of contact means is stationary and the other is movable; and in which said first and second unit of said pair of permanent magnet means are respectively small and large permanent magnets relative to each other.

3. A switching device as in claim 2 in which said mechanical means comprises a pair of armature members, one of said armature members being actuable by said large permanent magnet for moving said mechanical means in one direction, and the other being actuable by said electro-magnetic means for moving said mechanical means in the other direction.

4. A switching device comprising a stationary structurally rigid contact means; a structurally rigid contact means movable into and out of a position of contact with said stationary contact means; permanent magnet means for holding said movable contact means in said position of contact, said permanent magnet means constituting the sole holding means therefor; and, electro-magnetic means acting on said movable contact means for overriding at will the holding action of said permanent magnet means and effecting movement of said movable contact means out of said position of contact, said electro-magnetic means acting on said movable contact means only during a phase of said movement, both said contact means being characterized by the fact that when in said position of contact they form a system which is inherently free of elastic members responsive to harmonic vibrations and is incapable of acquiring vibratory energy.

5. The device of claim 4 including a second permanent magnet means acting on said movable contact means, for completing said movement.

6. A switching device comprising a pair of structurally rigid stationary contact means; a structurally rigid contact means movable from one to the other of said stationary contact means; separate permanent magnet means for holding said movable contact means in contact with the respective stationary contact means and constituting the sole holding means for the purpose; and electro-magnetic means acting on said movable contact means for overriding at will the holding action of one of said permanent magnet means and effecting said movement, said electro-magnetic means acting on said movable contact means only during a phase of said movement, both said stationary contact means and said movable contact means being characterized by the fact that when in said position of contact they form a system which is inherently free of elastic members responsive to harmonic vibrations and is incapable of acquiring vibratory energy.

7. The device of claim 6 in which the other of said permanent magnet means acts on said movable contact means for completing said movement.

8. A switching device comprising a rigid stationary contact means; a second rigid contact means mounted for movement into and out of a position of contact with said stationary contact means; permanent magnet means exerting a magnetic tractive force on said movable contact means sufficient, when the latter is in said position of contact, to maintain at least a determined minimum contact pressure between the respective contact means, both said contact means being characterized by the fact that when in said position of contact they form a system which is inherently free of elastic members responsive to harmonic vibrations and is incapable of acquiring vibratory energy; magnetically-actuated mechanical means movable between terminal positions of rest, for moving said movable contact means into and out of said position of contact, said magnetically-actuated mechanical means being disengaged from said movable contact means when the latter is in said position of contact; a second permanent magnet means for moving said magnetically-actuated means from said terminal position of rest in which it is disengaged from said movable contact means, to the other of said terminal positions of rest in which said movable contact means is held out of said position of contact solely by permanent magnetic traction exerted by said second permanent magnet means; and, electro-magnetic means for exerting a magnetic tractive force on said magnetically-actuated magnetic means to override at will the magnetic tractive force of said second permanent magnet means and restore said movable contact means to said position of contact.

9. The device of claim 8 in which said movable contact means and said magnetically-actuated mechanical means are mounted for movement at their respective centers of gravity whereby the application of extraneous shock loads to said means does not produce forces sufficient to effect movement of said means or affect their proper functioning under the design conditions.

10. An alternating current relay comprising a pair of contact frames each having a contact point in spaced apart opposing relation to the contact point of the other; a pivotally mounted switch arm, said switch arm comprising an armature member, a contact-carrying member, and a tongue member, said contact-carrying member extending between said contact points for back and forth movement therebetween; a pivotally mounted lever member for mechanically effecting opposite pivotal movement of said switch arm, comprising adjustably-spaced levering elements between which said tongue member is disposed to float, and a pair of armature members; a pair of permanent magnets for holding said contact-carrying member in firm contact with the respective contact points, said magnets being weak and strong relative to each other, said weak magnet being disposed to exert magnetic traction on said switch arm armature member tending to move the switch arm pivotally in a direction to bring the contact-carrying member of the switch arm into contacting engagement with one of said pair of contact points, and said strong magnet being disposed to exert magnetic traction on one of said lever armature members tending to move the lever member pivotally in a direction to effect engagement between one of said levering elements and said tongue portion and effect pivotal movement of the switch arm in a corresponding direction so as to bring its contact-carrying member into contacting engagement with the other of said pair of contact points; and, electro-magnetic means disposed to exert magnetic traction at will on the other of said switch arm armature members, for over-riding the normal magnetic tractive effect of said large magnet on said switch arm and moving the lever member in a direction to effect engagement between the other of said levering elements and said tongue portion, and pivotal movement of said switch arm toward said weak magnet sufficient to enable the tractive force of the latter on the switch arm armature to complete movement of the switch arm to the contacting position, said tongue member floating between said levering elements in said contacting position.

References Cited in the file of this patent

UNITED STATES PATENTS

| | | |
|---|---|---|
| 570,212 | Wurts | Oct. 27, 1896 |
| 1,701,357 | Butler | Feb. 5, 1929 |
| 1,989,277 | Jeffrey | Jan. 29, 1935 |
| 2,300,822 | Wells | Nov. 3, 1942 |
| 2,302,250 | Penn | Nov. 17, 1942 |
| 2,376,664 | Crise | May 22, 1945 |
| 2,492,023 | Whittaker | Dec. 20, 1949 |
| 2,524,525 | Hermann et al. | Oct. 3, 1950 |
| 2,676,221 | Malone | Apr. 20, 1954 |

FOREIGN PATENTS

| | | |
|---|---|---|
| 333,312 | Germany | Feb. 22, 1921 |